Aug. 31, 1965     A. P. MANONI ETAL     3,203,268
WORM SHAFT AND GEAR ASSEMBLY
Filed March 12, 1963
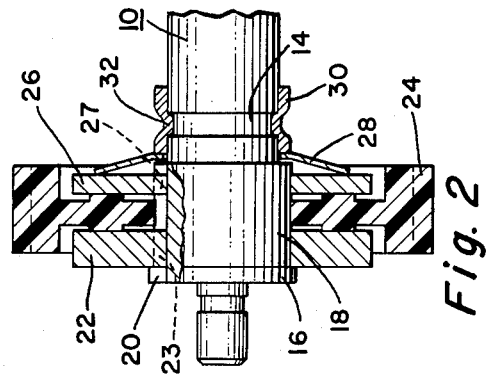
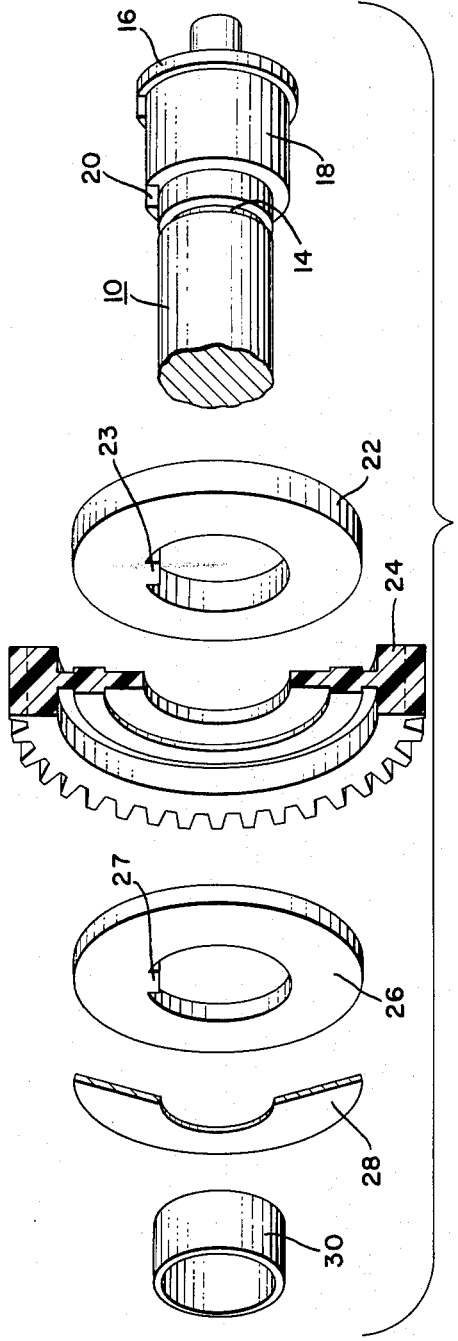
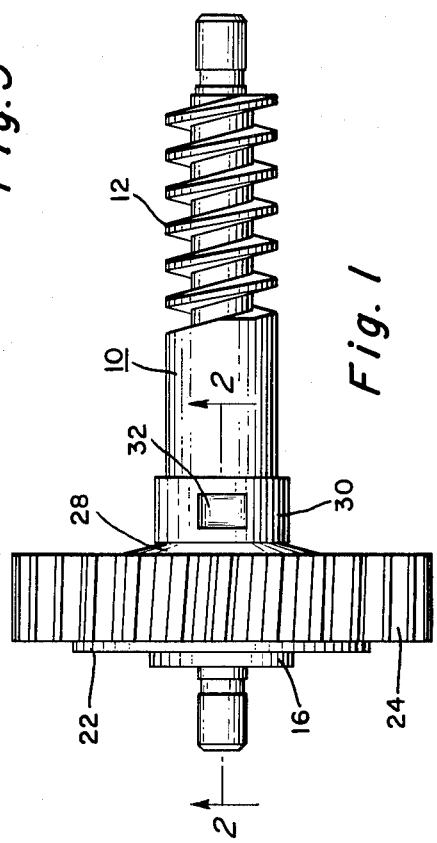
INVENTORS
Arthur P. Manoni
John A. Schum
BY
*W. E. Finken*
Their Attorney

# United States Patent Office 3,203,268
Patented Aug. 31, 1965

3,203,268
WORM SHAFT AND GEAR ASSEMBLY
Arthur P. Manoni and John A. Schum, Rochester, N.Y., assignors to General Motors Corporation, Detroit, Mich., a corporation of Delaware
Filed Mar. 12, 1963, Ser. No. 264,607
1 Claim. (Cl. 74—411)

This invention pertains to gear reduction assemblies, and particularly to an improved worm shaft and gear assembly and a method of making same.

Most present day vehicles have pivotally movable ventilator windows in the front doors thereof, and some vehicles are equipped with electric motor driven regulators for operating these ventilator windows. In the latter instance, it is necessary to incorporate a gear reduction between the motor shaft and the ventilator window to reduce motor speed and amplify the output torque. In most instances this gear reduction takes the form of a two-stage worm and worm gear assembly wherein the armature shaft of the motor has a worm which engages a worm gear, and the gear in turn is drivingly connected to a shaft having a second worm which engages a worm gear attached to the pivot shaft of the ventilator window.

Since the control circuit for the electric motor operates on a stall cycle to simplify the circuit and reduce the cost, it is necessary to embody some type of overload clutch in the worm shaft and gear assembly to protect the motor when it is operated with the ventilator window either fully closed or fully open, or in instances where the ventilator window encounters an obstruction during its movement. Heretofore, this clutch has taken the form of a single clutch plate keyed to the worm shaft and held in frictional engagement with the web of the worm gear by a Belleville spring washer. In making this assembly the Belleville washer is seated against a flange on the worm shaft, the worm gear is journalled on the worm shaft and the clutch plate is held in assembled relation therewith by spinning over a sleeve portion on the worm shaft. With this type of assembly it is difficult to control the pressure of the Belleville spring washer, and accordingly, excessive worm breakage has been experienced.

The present invention relates to an improved worm shaft and gear assembly wherein the pressure exerted by the Belleville spring washer, and hence the output torque, can be more accurately controlled during the manufacturing process. Accordingly, among our objects are the provision of an improved clutch assembly; the further provision of a worm shaft and gear assembly including a Belleville spring type clutch; the still further provision of an improved method of making a worm shaft and gear assembly with a Belleville spring type clutch.

The aforementioned and other objects are accomplished in the present invention by utilizing a pair of clutch plates disposed on opposite sides of the worm gear, the clutch plates being keyed to the worm shaft. The worm shaft is formed with an annular groove axially spaced from the worm gear, and which slidably receives a collar. The Belleville spring washer is interposed between the collar and one of the clutch plates such that the requisite spring pressure can be obtained by forcing the collar towards the clutch plate and thereafter staking the collar to the grooved portion of the worm shaft.

Further objects and advantages of the present invention will be apparent from the following description, reference being had to the accompanying drawings wherein a preferred embodiment of the present invention is clearly shown.

In the drawing:
FIGURE 1 is a side view in elevation of the improved worm shaft and gear assembly;

FIGURE 2 is a fragmentary view partly in section and partly in elevation taken on line 2—2 of FIGURE 1;
FIGURE 3 is a fragmentary exploded view, partly in section and partly in elevation, of the component parts of the improved clutch assembly.

With reference to FIGURE 1, the improved worm shaft and gear assembly comprises a shaft 10 having an integral worm 12 thereon adjacent one end. The shaft 10, as seen in FIGURE 2 is formed with an annular groove 14, and a shoulder 16 adjacent the other end thereof. The shaft 10 is also formed with a hub portion 18 having an axially extending keyway 20. The component parts of the assembly include the shaft 10, a first clutch plate 22, a worm gear 24 formed of a self-lubricating plastic such as nylon, a second clutch plate 26, a Belleville spring washer 28 and a collar 30.

In assembling the several component parts, the first clutch plate 22 is slipped over the hub 18 with its key 23 seated in the keyway 20, the central opening in the clutch plate 22 being of smaller diameter than the shoulder 16. Thereafter the worm gear 24 is slide onto the hub 18 and the second clutch plate 26 is slid onto the hub 18 with its key 27 engaging the keyway 20. Subsequently, the Belleville spring washer 28 is placed on the worm shaft 10 in engagement with the second clutch plate 26, and thereafter the collar 30 is slipped over the worm shaft 10 and forced axially to the left, as seen in FIGURES 1 and 2, until the requisite pressure is applied to the clutch plates by the Belleville spring washer 28. The pressure exerted by the Belleville spring washer 28 controls the output torque, i.e., the torque which will be required to cause the worm gear to slip relative to the clutch plates. With the Belleville spring stressed by the collar 30, the collar is staked in position at one or more places 32 to retain the parts in assembled relation.

It is readily apparent that by assembling the worm shaft and gear assembly in the aforesaid manner, the pressure applied by the Belleville spring washer can be accurately controlled in a straightforward manner, thus greatly facilitating mass production of these assemblies. By accurately controlling the output torque of the worm shaft and gear assembly, breakage of worms in window regulator mechanism will be obviated.

While the embodiment of the present invention as herein disclosed constitutes a preferred form, it is to be understood that other forms might be adopted.

What is claimed is as follows:
A worm shaft and gear assembly including, a shaft having an integral worm adjacent one end thereof and a hub adjacent the other end thereof with an upstanding shoulder, said hub having an axially extending keyway, a gear journalled on said hub, a pair of clutch plates keyed to said hub and disposed on opposite sides of said gear, a Belleville spring washer engaging one of said clutch plates, and a collar engaging said Belleville spring washer for stressing the same to maintain said other clutch plate in abutment with said shoulder and both clutch plates in frictional engagement with said gear to control the output torque, said shaft having an annular groove spaced axially from said hub, said collar being staked in said annular groove to maintain said Belleville spring washer under said stress.

References Cited by the Examiner
UNITED STATES PATENTS

| | | | |
|---|---|---|---|
| 1,472,848 | 11/26 | Maag | 74—425 |
| 2,337,902 | 12/43 | Lakin. | |
| 2,659,220 | 11/53 | Cherry | 64—30 X |
| 2,753,703 | 7/56 | McIntyre | 64—30 |
| 3,067,627 | 12/62 | Pickles | 74—425 |
| 3,092,983 | 6/63 | Huber | 64—30 |

DON A. WAITE, *Primary Examiner.*